United States Patent
Dawkins et al.

(10) Patent No.: US 6,901,537 B2
(45) Date of Patent: May 31, 2005

(54) METHOD AND APPARATUS FOR PREVENTING THE PROPAGATION OF INPUT/OUTPUT ERRORS IN A LOGICAL PARTITIONED DATA PROCESSING SYSTEM

(75) Inventors: George John Dawkins, Austin, TX (US); Mark Elliott Hack, Cedar Park, TX (US); Ashwini Kulkarni, Austin, TX (US); Gordon D. McIntosh, Austin, TX (US); Kanisha Patel, Cedar Park, TX (US); David Lee Randall, Leander, TX (US); David R. Willoughby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 522 days.

(21) Appl. No.: 10/087,921

(22) Filed: Feb. 27, 2002

(65) Prior Publication Data

US 2003/0163768 A1 Aug. 28, 2003

(51) Int. Cl.[7] ................................................ G06F 11/00
(52) U.S. Cl. .......................................... 714/43; 714/36
(58) Field of Search ............................. 714/43, 36, 56, 714/48; 710/314, 48

(56) References Cited

U.S. PATENT DOCUMENTS

| | | | | |
|---|---|---|---|---|
| 6,523,140 B1 | * | 2/2003 | Arndt et al. | 714/44 |
| 6,557,121 B1 | * | 4/2003 | McLaughlin et al. | 714/44 |
| 6,643,727 B1 | * | 11/2003 | Arndt et al. | 710/314 |
| 6,654,906 B1 | * | 11/2003 | Arndt | 714/11 |
| 6,658,591 B1 | * | 12/2003 | Arndt | 714/6 |
| 6,658,599 B1 | * | 12/2003 | Linam et al. | 714/25 |
| 6,665,759 B2 | * | 12/2003 | Dawkins et al. | 710/200 |
| 6,701,464 B2 | * | 3/2004 | Austen et al. | 714/48 |
| 6,792,564 B2 | * | 9/2004 | Ahrens et al. | 714/45 |
| 2002/0087919 A1 | * | 7/2002 | Bennett | 714/43 |
| 2002/0124194 A1 | * | 9/2002 | Dawkins et al. | 713/310 |
| 2002/0152344 A1 | * | 10/2002 | Holm et al. | 710/260 |
| 2002/0184576 A1 | * | 12/2002 | Arndt et al. | 714/48 |

* cited by examiner

*Primary Examiner*—Robert Beausoliel
*Assistant Examiner*—Christopher McCarthy
(74) *Attorney, Agent, or Firm*—Duke W. Yee; Mark E. McBurney; Steven T. McDonald

(57) ABSTRACT

A method, apparatus, and computer instructions for halting input/output error propagation in the logically partitioned data processing system. All components associated with the bridge are identified to form a set of failed components in response to detecting an error state in a bridge within a set of bridges in the logical partitioned data processing system. An identification of the failed components is stored in which the identification is used by each partition during a boot process.

20 Claims, 4 Drawing Sheets

100 DATA PROCESSING SYSTEM

METHOD AND APPARATUS FOR PREVENTING THE PROPAGATION OF INPUT/OUTPUT ERRORS IN A LOGICAL PARTITIONED DATA PROCESSING SYSTEM

BACKGROUND OF THE INVENTION

1. Technical Field

The present invention relates generally to an improved data processing system, and in particular, to a method and apparatus for handling errors in a data processing system. Still more particularly, the present invention provides a method and apparatus for preventing propagation of input/output errors in a logical partitioned data processing system.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, memory dimms, non-volatile random access memory (NVRAM), and hard disk drives. Each partition within the LPAR system may be booted and shutdown over and over without having to power-cycle the whole system.

In reality, some of the I/O devices that are disjointly shared among the partitions are themselves controlled by a common piece of hardware, such as a host Peripheral Component Interface (PCI) bridge, which may have many I/O adapters controlled or below the bridge. This bridge may be thought of as being shared by all of the partitions that are assigned to its slots. Hence, if the bridge becomes inoperable, it affects all of the partitions that share the devices that are below the bridge. Indeed, the problem itself may be so severe that the whole LPAR system will crash if any partition attempts to further use the bridge. In other words, with a crash, the entire LPAR system fails. The normal course of action is to terminate the running partitions that share the bridge, which will keep the system from crashing due to this failure.

What usually occurs is an I/O adapter failure that causes the bridge to assume a non-usable (error) state. At the time of occurrence, the I/O failure invokes a machine check interrupt (MCI) handler, which, in turn, will report the error and then terminate the appropriate partitions. This process is a "normal" solution that prevents the whole LPAR system from crashing due to this problem.

However, a partition that has not yet been started or one of the terminated partitions may be restarted. In such a case, if the partition being started includes devices with a path containing the bridge, the LPAR system may crash. With such a failure, partitions that did not contain devices having a path through the failed bridge also will terminate because of the failure. Therefore, it would be advantageous to have an improved method, apparatus and computer instructions for preventing I/O error propagation in LPAR systems.

SUMMARY OF THE INVENTION

The present invention provides a method, apparatus, and computer instructions for halting input/output error propagation in the logically partitioned data processing system. All components associated with the bridge are identified to form a set of failed components in response to detecting an error state in a bridge within a set of bridges in the logical partitioned data processing system. An identification of the failed components is stored in which the identification is used by each partition during a boot process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
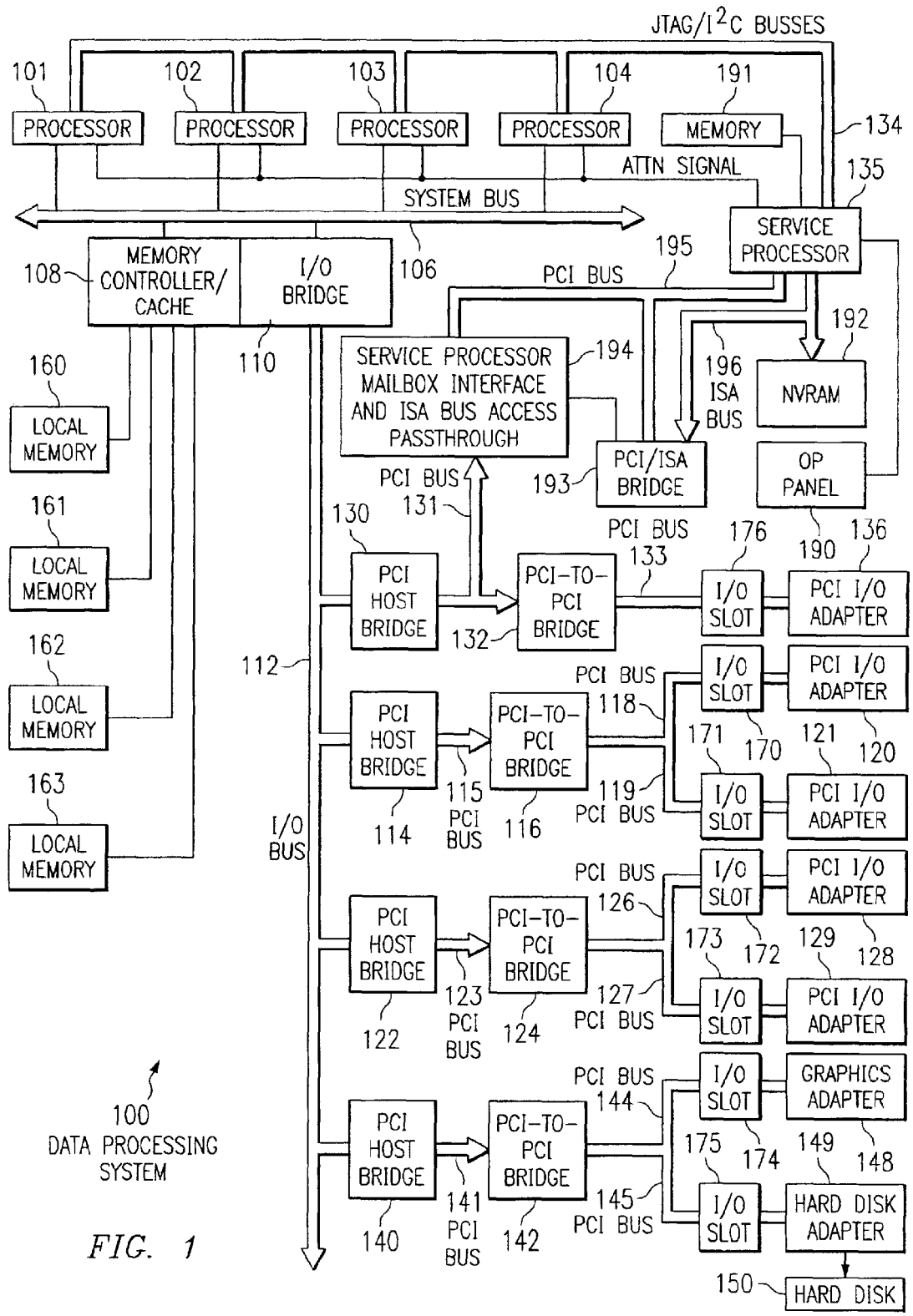
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and each of local memories 160–163 is assigned to one of the three partitions. For example, processor 101, local memory 160, and PCI I/O adapters 120, 128, and 129 may be assigned to logical partition P1; processors 102–103, local memory 161, and PCI I/O adapters 121 and 136 may be assigned to partition P2; and processor 104, local memories 162–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface between PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and host bridge 140. Hard disk adapter 149 may be placed into I/O slot 175, which is connected to PCI bus 145. In turn, this bus is connected to PCI-to-PCI bridge 142, which is connected to PCI Host Bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/scan I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases the host processors 101–104 for execution of the code loaded into host memory 160–163. While the host processors 101–104 are executing code from respective operating systems within the data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110. Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
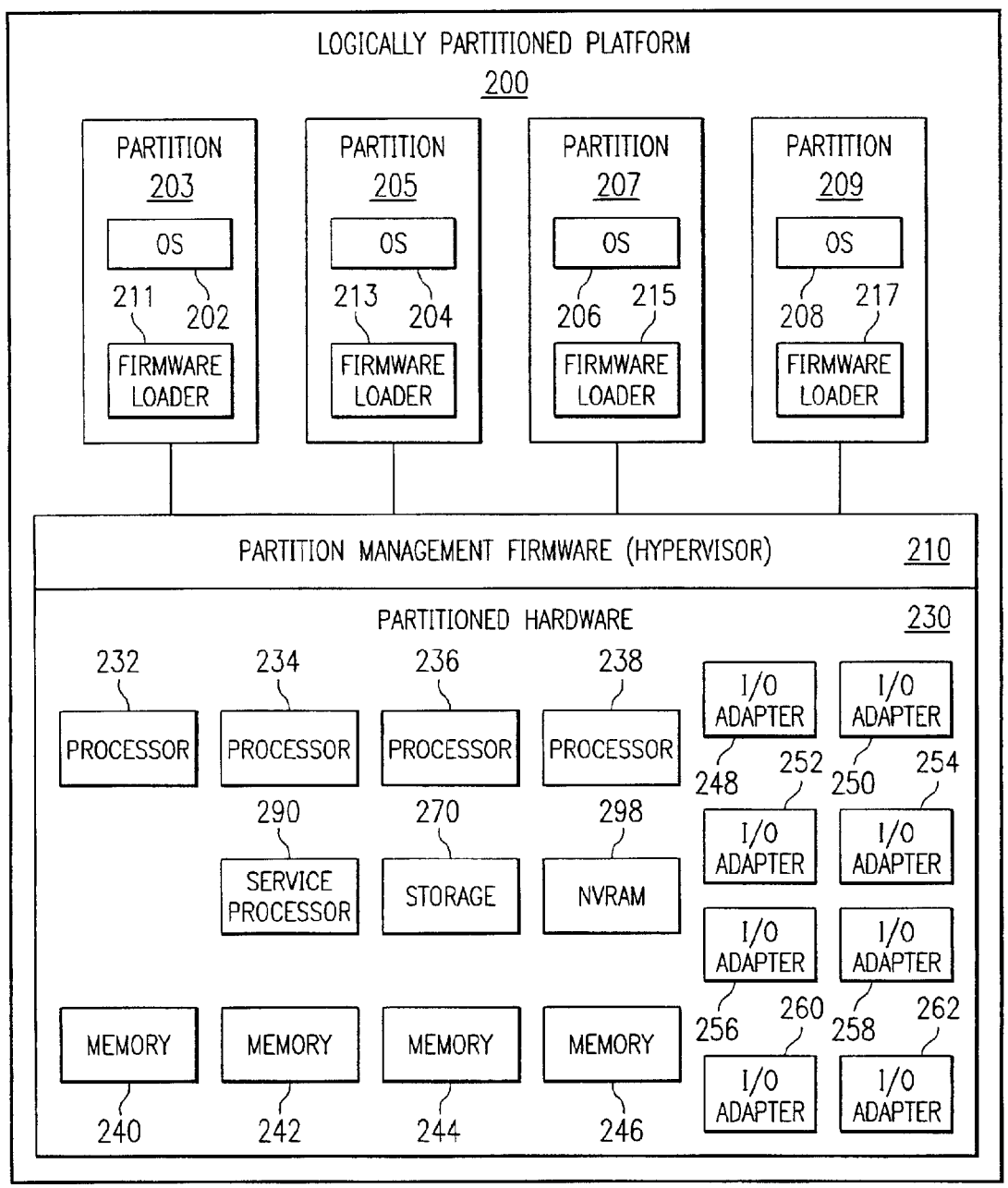
FIG. 2 is a block diagram of an exemplary logically partitioned platform in which the present invention may be implemented.

With reference now to FIG. 2, a block diagram of an exemplary logically partitioned platform is depicted in which the present invention may be implemented. The hardware in logically partitioned platform 200 may be implemented as, for example, data processing system 100 in FIG. 1. Logically partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209. Additionally, these partitions also include firmware loaders 211, 213, 215, and 217. When partitions 203, 205, 207, and 209 are instantiated, a copy of the open firmware is loaded into each partition by the hypervisor's partition manager. The processors associated or assigned to the partitions are then dispatched to the partitions' memory to execute the partition firmware.

Partitioned hardware 230 includes a plurality of processors 232–238, a plurality of system memory units 240–246, a plurality of input/output (I/O) adapters 248–262, and a storage unit 270. Partition hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logically partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logically partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 202, 204, 206, and 208 by virtualizing all the hardware resources of logically partitioned platform 200.

Figure 3:
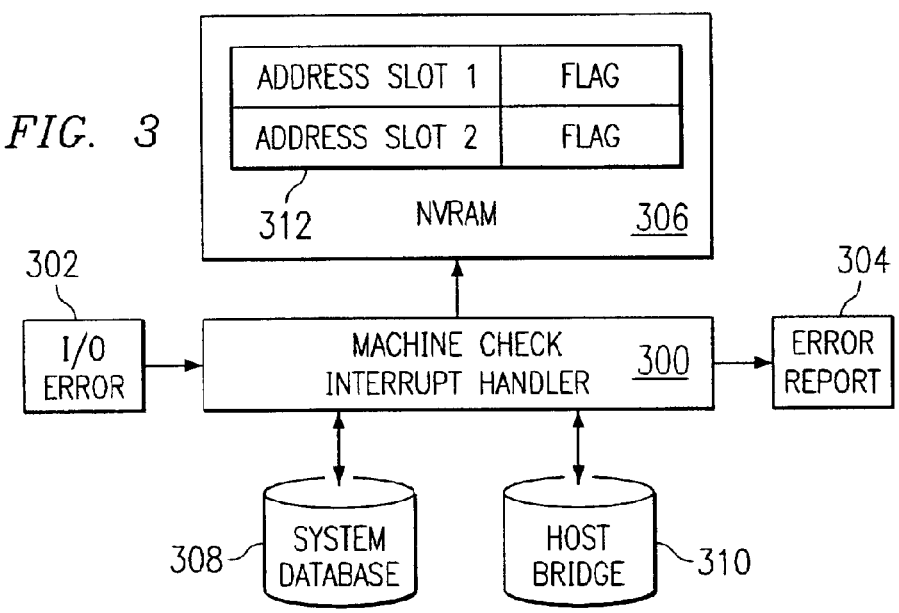
FIG. 3 is a diagram illustrating a system for preventing I/O error propagation in LPAR data processing systems in accordance with a preferred embodiment of the present invention.

With reference now to FIG. 3, a diagram illustrating a system for preventing I/O error propagation in LPAR data processing systems is depicted in accordance with a preferred embodiment of the present invention. The system illustrated in FIG. 3 may be illustrated in a LPAR system, such as data processing system 100 in FIG. 1. Machine check interrupt handler 300 receives an I/O error 302, which may originate from a partition, such as partition 203 or 205 in FIG. 2. In this example, the I/O error indicates that an adapter in an I/O slot, I/O error 302, indicates that a host bridge, such as PCI host bridge 114 is in a non-usable or error state. This error state is caused by an error in an I/O adapter associated with the host bridge.

Other partitions in these examples will continue to operate until an application or process within one of these partitions attempts to use the affected bridge. Machine check interrupt handler 300 will disable or terminate a partition in which a machine check interrupt occurs as a result of an attempt by an application or process in the partition to use the host bridge. The disabled or terminated partition is not allowed to be rebooted to avoid a system failure. The partition generating the error, as well as other partitions affected by this error, are terminated. Machine check interrupt handler 300 processes this error to generate error report 304. Additionally, machine check interrupt handler 300 will set a flag in NVRAM 306 to prevent other partitions that share the bridge from booting or being activated. NVRAM 306 may be implemented as NVRAM 192 in FIG. 1. When a partition is booted or activated, instructions are executed to start a partition. These instructions search for the operating system, load it and pass control to it.

Machine check interrupt handler 300 identifies each I/O slot associated with the host bridge identified in I/O error 302. This information may be identified from system database 308, which contains the association of slots with host bridges. This information also may be identified by querying host bridge 310, which in this case, is the failing host bridge identified in I/O error 302.

The address of each slot is stored in NVRAM 306 with a flag set in association with the address as illustrated by data structure 312. This data structure may be, for example, a table stored in NVRAM 306. The flag indicates that the I/O slot associated with the address is connected to a failing bridge. In this manner, when a partition boots up, data structure 312 may be queried to determine whether devices in I/O slots are connected to a failing host bridge. If such a device is present for a partition, then the partition boot process will be terminated along with an error indication. This error indication may include an identification of the components in the path to the failed host bridge. Data structure 312 may be cleared upon a complete system reboot, which usually clears up the problem.

Figure 4:
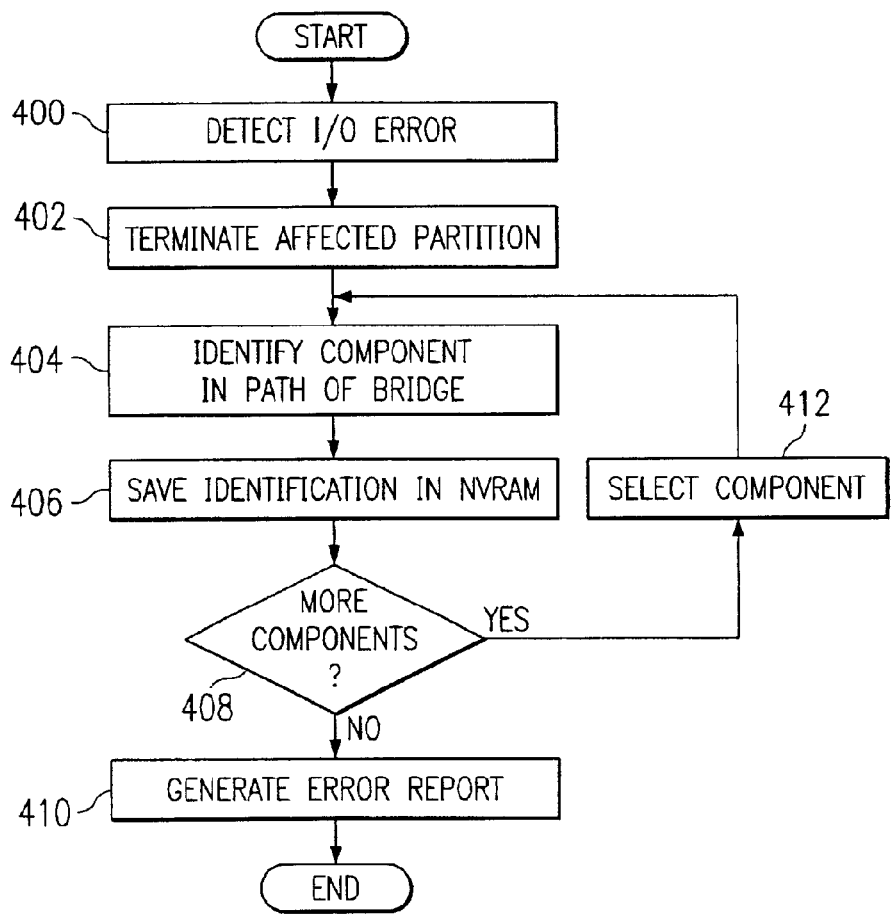
FIG. 4 is a flowchart of a process used for identifying components in response to a host bridge failure in accordance with a preferred embodiment of the present invention.

Turning now to FIG. 4, a flowchart of a process used for identifying components in response to a host bridge failure is depicted in accordance with a preferred embodiment of the present invention. The process illustrated in FIG. 4 may be implemented in a machine check interrupt handler, such as machine check interrupt handler 300 in FIG. 3.

The process begins by an I/O error being detected (step 400). The affected partition is terminated (step 402). A component in the path of the bridge is identified (step 404). A component is in the path of the bridge if the component is connected to the host bridge by a bus or other interface. This component, in this example, is an I/O slot. Alternatively, the adapters connected to the I/O slots may be identified in addition to or in place of the I/O slot. This identification may be made by querying a database, identifying components associated with bridges, or the bridge itself. The identification is saved in NVRAM (step 406). In this example, the address of the I/O slot is saved in the NVRAM. Other information in addition to or in place of this address may be saved. For example, an identifier or serial number for the adapter connected to the slot may be used.

A determination is then made as to whether more components are present (step 408). This step is used to determine whether more components in the path of the bridge with the bridge are present, but have not been identified by the process. If more components are not present, an error report is generated (step 410) with the process terminating thereafter.

Returning to step 408, if more components are present, a component is selected (step 412) and the process returns to step 404 as described above.

Figure 5:
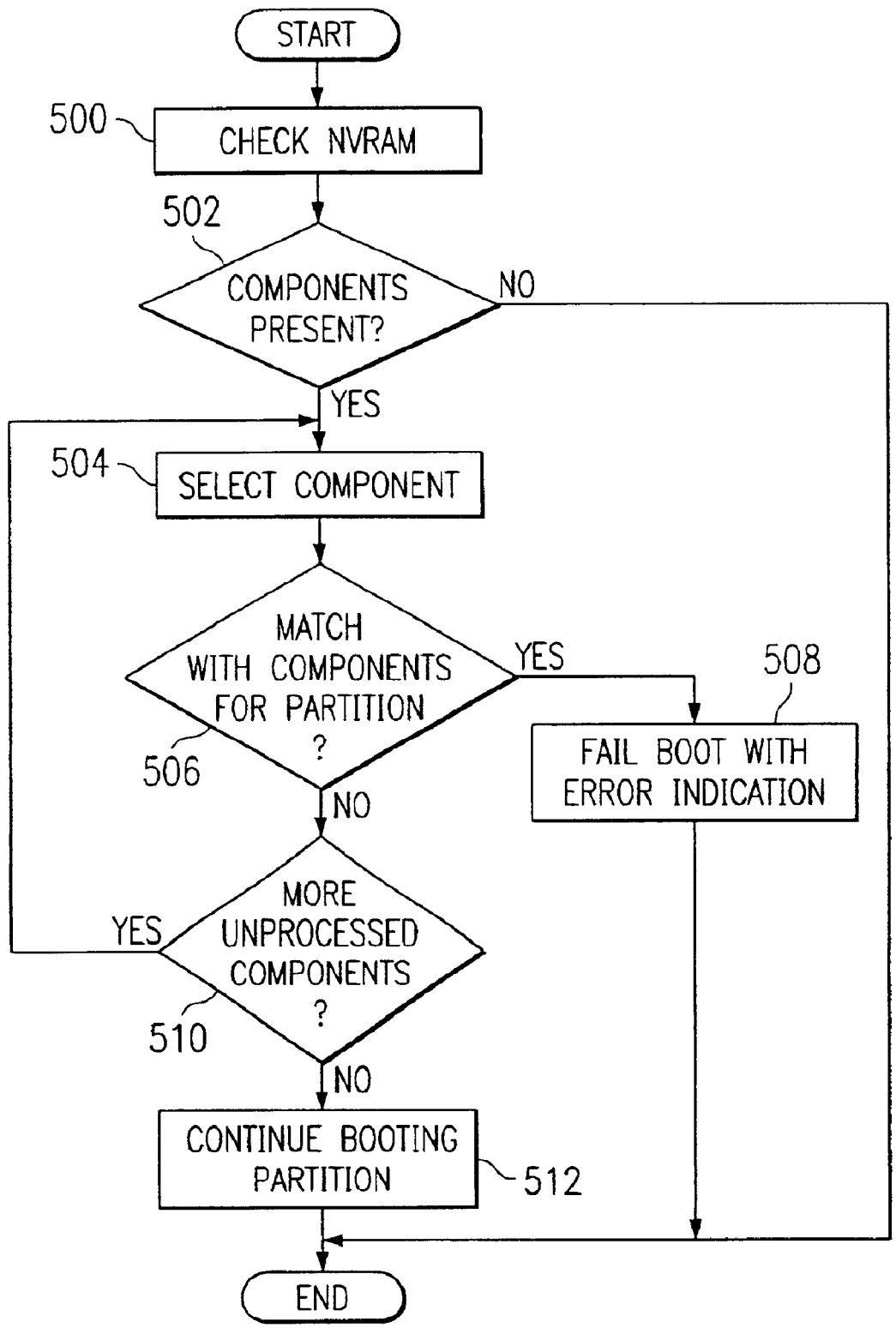
FIG. 5 is a flowchart of a process used for booting a partition in accordance with a preferred embodiment of the present invention.

With reference next to FIG. 5, a flowchart of a process used for booting a partition is depicted in accordance with a preferred embodiment of the present invention. The process illustrated in FIG. 5 may be implemented in a partition management firmware, such as partition management firmware 210 in FIG. 2.

The process begins by checking NVRAM (step 500). The NVRAM in this example is NVRAM 306 in FIG. 3. A determination is then made as to whether components are present (step 502). This step is used to identify whether any components flagged as being associated with a failed host bridge are present. This step may be implemented by checking a data structure, such as data structure 312 in FIG. 3. In these examples, the components are identified using addresses for I/O slots.

If components are present, a component is selected (step 504). Next, a determination is made as to whether a match between the selected component and the components for the partition is present (step 506). If a match is present, the boot process fails with an error indication (step 508), and the process terminates thereafter. The failing of the boot process occurs by terminating the processing of instructions for initializing the partition.

Returning again to step 506, if a match with the components for the partition is absent, a determination is made as to whether there are more unprocessed components (step 510). If more unprocessed components are absent, the booting partition is continued (step 512) and the process terminates thereafter.

With reference again to step 510, if more unprocessed components are present, the process returns to step 504 as described above to select another component for processing. Returning again to step 502, if components are absent, the process terminates. If components are absent in step 512, this result means that no components have been stored in the NVRAM as being in a path with a failed host bridge.

Thus, the present invention provides a method, apparatus, and computer implemented instructions for preventing the propagation of input/output errors in a logical partition system. When errors cause a bridge to assume a nonusable or error state, a process, such as one in a machine check interrupt handler, handles the error and terminates partitions affected by the error. In addition, components associated with the host bridge are stored in a memory, such as NVRAM 192 in FIG. 1, for use when other partitions are started or if a terminated partition is restarted. The memory in which these identifications are stored is checked whenever a partition is started or restarted. If a component assigned to a partition is identified in the memory as being associated with a failed host bridge, the booting or starting of the partition is terminated. In this manner, additional errors which may result in the entire system crashing or terminating may be avoided. In other words, partitions unaffected by these errors may continue to operate.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system for halting input/output error propagation in the logical partitioned data processing system, the method comprising:

responsive to detecting an error state in a bridge from a plurality of bridges in the logical partitioned data processing system, identifying all components associated with the bridge to form a set of failed components; and storing an identification of the failed components, wherein the identification is used by each partition during a boot process.

2. The method of claim 1, wherein the identifying step comprises:

identifying slots associated with the bridge to form identified slots; and identifying components associated with the identified slots to form the set of identified components.

3. The method of claim 1, wherein the identifying step and the storing step are performed by a machine check interrupt handler.

4. The method of claim 1, wherein the set of components is a set of input/output devices.

5. The method of claim 1, wherein the set of components includes at least one of a random access memory, a hard disk drive, and an adapter.

6. The method of claim 1, wherein the identification prevents any partition sharing the bridge from starting.

7. A method in a logical partitioned data processing system for halting input/output error propagation in the data processing system, the method comprising:

identifying components associated with a partition within the logical partitioned data processing system during booting of the partition to form a set of partition components;

searching a memory to determine whether a component within the set of partition components is identified within the memory; and failing the booting of the partition in response to the component being identified within the memory.

8. The method of claim 7 further comprising:

generating an error indication in response to the component being identified within the memory.

9. A data processing system for halting input/output error propagation in the logical partitioned data processing system, the data processing system comprising:

a bus system;

a communications unit connected to the bus system;

a memory connected to the bus system, wherein the memory includes a set of instructions; and a processing unit connected to the bus system, wherein the processing unit executes the set of instructions to identify all components associated with the bridge to form a set of failed components in response to detecting an error state in a bridge from a plurality of bridges in the logical partitioned data processing system; and store an identification of the failed components in which the identification is used by each partition during a boot process.

10. A logical partitioned data processing system for halting input/output error propagation in the data processing system, the data processing system comprising:

a bus system;

a communications unit connected to the bus system;

a memory connected to the bus system, wherein the memory includes a set of instructions; and a processing unit connected to the bus system, wherein the processing unit executes the set of instructions to identify components associated with a partition within the logical partitioned data processing system during booting of the partition to form a set of partition components; search a memory to determine whether a component within the set of partition components is identified within the memory; and fail the booting of the partition in response to the component being identified within the memory.

11. A logical partitioned data processing system for halting input/output error propagation in the logical partitioned data processing system, the data processing system comprising:

identifying means, responsive to detecting an error state in a bridge from a plurality of bridges in the logical partitioned data processing system, for identifying all components associated with the bridge to form a set of failed components; and storing means for storing an identification of the failed components, wherein the identification is used by each partition during a boot process.

12. The data processing system of claim 11, wherein the identifying means comprises:

first identifying means for identifying slots associated with the bridge to form identified slots; and second identifying means for identifying components associated with the identified slots to form the set of identified components.

13. The data processing system of claim 11, wherein the identifying means and the storing moans are performed by a machine check interrupt handler.

14. The data processing system of claim 11, wherein the set of components is a set of input/output devices.

15. The data processing system of claim 11, wherein the set of components includes at least one of a random access memory, a hard disk drive, and an adapter.

16. The data processing system of claim 11, wherein the identification prevents any partition sharing the bridge from starting.

17. A logical partitioned data processing system for halting input/output error propagation in the data processing system, the data processing system comprising:

identifying means for identifying components associated with a partition within the logical partitioned data processing system during booting of the partition to form a set of partition components;

searching means for searching a memory to determine whether a component within the set of partition components is identified within the memory; and failing means for failing the boating of the partition in response to the component being identified within the memory.

18. The data processing system of claim 17 further comprising:

generating means for generating an error indication in response to the component being identified within the memory.

19. A computer-readable medium containing computer-readable instructions which are executable for halting input/output error propagation in the logical partitioned data processing system, the computer program product comprising:

first instructions, responsive to detecting an error state in a bridge from a plurality of bridges in the logical partitioned data processing system, for identifying all components associated with the bridge to form a set of filed components; and second instructions for storing an identification of the failed components, wherein the identification is used by each partition during a boot process.

20. A computer-readable medium containing computer-readable instructions which are executable for halting input/output error propagation in the data processing system, the computer program product comprising:

first instructions for identifying components associated with a partition within the logical partitioned data processing system during booting of the partition to form a set of partition components;

second instructions for searching a memory to determine whether a component within the set of partition components is identified within the memory; and third instructions for failing the booting of the partition in response to the component being identified within the memory.

* * * * *

UNITED STATES PATENT AND TRADEMARK OFFICE
CERTIFICATE OF CORRECTION

PATENT NO. : 6,901,537 B2 Page 1 of 1
DATED : May 31, 2005
INVENTOR(S) : Dawkins et al.

It is certified that error appears in the above-identified patent and that said Letters Patent is hereby corrected as shown below:

Column 10,
Line 2, after "storing" delete "moans" and insert -- means --.
Line 22, after "failing the" delete "boating" and insert -- booting --.
Line 39, before "components" delete "filed" and insert -- failed --.

Signed and Sealed this

Eighteenth Day of April, 2006

JON W. DUDAS
*Director of the United States Patent and Trademark Office*